(12) United States Patent
Han (10) Patent No.: US 12,373,276 B2
(45) Date of Patent: Jul. 29, 2025

(54) METHOD, SYSTEM AND APPARATUS FOR FAULT POSITIONING IN STARTING PROCESS OF SERVER

(71) Applicant: SHANDONG YINGXIN COMPUTER TECHNOLOGIES CO., LTD., Shandong (CN)

(72) Inventor: Hongrui Han, Shandong (CN)

(73) Assignee: SHANDONG YINGXIN COMPUTER TECHNOLOGIES CO., LTD., Shandong (CN)

( * ) Notice: Subject to any disclaimer, the term of this patent is extended or adjusted under 35 U.S.C. 154(b) by 93 days.

(21) Appl. No.: 18/036,573

(22) PCT Filed: Sep. 28, 2021

(86) PCT No.: PCT/CN2021/121421
§ 371 (c)(1),
(2) Date: May 11, 2023

(87) PCT Pub. No.: WO2022/198972
PCT Pub. Date: Sep. 29, 2022

(65) Prior Publication Data
US 2024/0012706 A1 Jan. 11, 2024

(30) Foreign Application Priority Data
Mar. 26, 2021 (CN) .......................... 202110326285.8

(51) Int. Cl.
*G06F 11/00* (2006.01)
*G06F 11/07* (2006.01)
(Continued)

(52) U.S. Cl.
CPC ........ *G06F 11/079* (2013.01); *G06F 11/1417* (2013.01); *G06F 11/2284* (2013.01)

(58) Field of Classification Search
CPC ............... G06F 11/079; G06F 11/1417; G06F 11/2284; G06F 11/2273; G06F 9/45541; G06F 9/4408; G06F 9/441
See application file for complete search history.

(56) References Cited

U.S. PATENT DOCUMENTS 5,822,582 A * 10/1998 Doragh ................. G06F 9/4418
719/321
5,860,002 A * 1/1999 Huang .................. G06F 15/177
709/222

(Continued)

FOREIGN PATENT DOCUMENTS

| CN | 1713156 A | 12/2005 |
| CN | 1917446 A | 2/2007 |

(Continued)

*Primary Examiner* — Loan L. T. Truong
(74) *Attorney, Agent, or Firm* — IPro, PLLC (57) ABSTRACT

A method, system and apparatus for fault location in a boot process of a server, the method including: dividing a whole boot process of a server into a plurality of stages in advance, and setting a respective fault monitoring policy for each of the stages (S1); when the boot process proceeds to a target stage, monitoring a current boot process of the server according to the fault monitoring policy corresponding to the target stage, and obtaining a fault monitoring result corresponding to the target stage (S2); and in response to a boot failure of the server, performing server fault location according to the obtained fault monitoring result (S3).

14 Claims, 3 Drawing Sheets

(51) Int. Cl.
*G06F 11/14* (2006.01)
*G06F 11/22* (2006.01)

(56) References Cited

U.S. PATENT DOCUMENTS

| | | | | |
|---|---|---|---|---|
| 6,216,226 | B1* | 4/2001 | Agha | G06F 11/1417 713/1 |
| 6,449,735 | B1* | 9/2002 | Edwards | G06F 11/22 714/25 |
| 6,560,726 | B1* | 5/2003 | Vrhel, Jr. | G06F 11/0757 714/E11.003 |
| 8,006,125 | B1* | 8/2011 | Meng | G06F 11/1417 714/6.2 |
| 2003/0163765 | A1* | 8/2003 | Eckardt | G06F 11/2284 714/36 |
| 2003/0200428 | A1* | 10/2003 | Chan | G06F 9/4416 713/1 |
| 2010/0306359 | A1* | 12/2010 | Dehaan | G06F 9/45533 709/223 |
| 2011/0145558 | A1* | 6/2011 | Khosravi | G06F 9/4416 710/107 |
| 2015/0154033 | A1* | 6/2015 | Qu | G06F 9/4416 713/2 |
| 2017/0255567 | A1* | 9/2017 | Vidyadhara | G06F 13/42 |
| 2018/0096151 | A1* | 4/2018 | Ghetie | G06F 21/575 |
| 2019/0045358 | A1* | 2/2019 | Ahmed | H04W 12/04 |
| 2020/0073773 | A1* | 3/2020 | Liu | G06F 9/4406 |
| 2020/0159302 | A1 | 5/2020 | Chaiken et al. | |
| 2020/0319894 | A1* | 10/2020 | Golov | B60R 16/0231 |

FOREIGN PATENT DOCUMENTS

| | | |
|---|---|---|
| CN | 101025709 A | 8/2007 |
| CN | 200986699 Y | 12/2007 |
| CN | 201145894 Y | 11/2008 |
| CN | 102981925 A | 3/2013 |
| CN | 104598359 A | 5/2015 |
| CN | 106598790 A | 4/2017 |
| CN | 106776282 A | 5/2017 |
| CN | 107145410 A | 9/2017 |
| CN | 107590009 A | 1/2018 |
| CN | 108462746 A | 8/2018 |
| CN | 110362430 A | 10/2019 |
| CN | 111399919 A | 7/2020 |
| CN | 112114989 A | 12/2020 |
| CN | 112286709 A | 1/2021 |
| CN | 113064747 A | 7/2021 |
| JP | 2003248598 A | 9/2003 |

\* cited by examiner

METHOD, SYSTEM AND APPARATUS FOR FAULT POSITIONING IN STARTING PROCESS OF SERVER

CROSS-REFERENCE TO RELATED APPLICATION

The present disclosure claims priority to Chinese patent application No. 202110326285.8, titled "METHOD, SYSTEM AND APPARATUS FOR FAULT LOCATION IN BOOT PROCESS OF SERVER", filed on Mar. 26, 2021 before the CNIPA, China National Intellectual Property Administration, which is incorporated herein in its entirety by reference.

TECHNICAL FIELD

The present disclosure relates to the field of server operation and maintenance, and in particular to a method, system and apparatus for fault location in a boot process of a server.

BACKGROUND

With the increasing scale of data center, tens of millions of servers bring great challenge to the operation and maintenance work, and intelligent operation and maintenance is increasingly proposed. At present, server boot abnormality exists in each data center. Since the whole boot process of the server includes many stages, the existing fault monitoring schemes in the boot process of a server are mostly local stage fault monitoring, which may not completely monitor the whole boot process of the server, resulting in poor fault location effect.

Therefore, how to provide a solution for solving the above-mentioned technical problem is a problem to be currently solved by those skilled in the art.

SUMMARY

The object of the present disclosure is to provide a method, system and apparatus for fault location in a boot process of a server.

To solve the above technical problem, the present application provides a method for fault location in a boot process of a server, including:
  dividing a whole boot process of the server into a plurality of stages in advance, and setting a respective fault monitoring policy for each of the stages;
  when the boot process of the server proceeds to a target stage, monitoring current boot process of the server according to a fault monitoring policy corresponding to the target stage, and obtaining a fault monitoring result corresponding to the target stage, wherein the target stage is any of the stages divided from the whole boot process of the server;
  performing, based on the obtained fault monitoring result, fault location of the server in response to a boot failure of the server.
In some embodiments, the dividing a whole boot process of the server into a plurality of stages includes:
  dividing the whole boot process of the server into a power-on mode entry stage, a hardware power-on stage, a basic input output system (BIOS) self-test stage, a BIOS running stage and an operating system (OS) boot stage.
In some embodiments, the server includes a complex programmable logic device (CPLD) and a management engine (ME) unit, wherein the CPLD is configured to receive a button signal of a power button and transmit the button signal to the ME unit via pass-through, the ME unit is configured to return a power-on boot signal to the CPLD to complete the power-on mode entry stage in response to receiving the button signal;
  a corresponding process of setting a fault monitoring policy for the power-on mode entry stage includes:
  starting timing since the button signal is received by the CPLD, and determining whether the power-on boot signal is sent by the ME unit when the timing time reaches a pre-set time T0;
  in response to the power-on boot signal being sent, determining that the ME unit runs normally;
  in response to no power-on boot signal being sent, determining that the ME unit fails to run.
In some embodiments, the server further includes a storage chip that is connected to the ME unit via a channel switching device and is used for storing a ME image file;
  the method for fault location in the boot process of the server further includes:
  in response to determining that the ME unit fails to run, determining whether a running state of the ME unit is available;
  in response to the running state of the ME unit being available, determining that a running abnormity exists in the ME unit when the running state is abnormal;
  in response to the running state of the ME unit being not available, determining whether a power supply voltage of the storage chip is normal;
  in response to the power supply voltage being abnormal, determining that a peripheral circuit of the storage chip is abnormal;
  in response to the power supply voltage being normal, determining that the peripheral circuit of the storage chip is normal, and establishing a communication with the storage chip by controlling the channel switching device, and determining whether the storage chip is accessible;
  in response to the storage chip being not accessible, determining that the storage chip is abnormal;
  in response to the storage chip being accessible, determining that the storage chip is normal, and determining whether the ME image file in the storage chip is available;
  in response to the ME image file in the storage chip being not available, determining that the ME image file is missing in the storage chip;
  in response to the ME image file in the storage chip being available, performing data verification on the ME image file in the storage chip, in response to a verification failure, determining that the ME image file in the storage chip is damaged, and flashing the storage chip according to system backups of the ME image file, and rebooting;
  in response to determining that an abnormality still exists after rebooting, determining that the ME unit itself malfunctions.
In some embodiments, a power supply system of the server includes a power supply unit (PSU) and a plurality of voltage regulated (VR) power supply chips connected to the PSU, wherein each of the VR power supply chips configured to supply power to a respective component of the server;
  and the CPLD is further configured to: send a main power enable signal to the PSU after receiving the power-on boot signal; successively send a chip enable signal to the plurality of VR power supply chips after receiving a power good (PG) signal returned from the PSU; and send, after receiving the PG signals returned by all the VR power supply chips, a power OK signal to complete the hardware power-on stage; the CPLD, after being updated in version, is further configured to record an abnormal situation, where the PSU or any of the VR power supply chip fails to return the PG signal on time, to a state register of the CPLD correspondingly, and successively control the VR power supply chips and the PSU that are powered on to perform a power-off operation;

a corresponding process of setting a fault monitoring policy for the hardware power-on stage comprises:

starting timing since the power-on boot signal is sent by the ME unit, and determining whether the power OK signal is sent by the CPLD when the timing time reaches a pre-set time T1;

in response to the power OK signal being sent, determining that a mainboard hardware of the server is powered on normally;

in response to no power OK signal being sent, determining that the mainboard hardware of the server is not powered on normally, and determining whether the CPLD has an abnormality recording function according to a version number of the CPLD;

in response to the CPLD having the abnormality recording function, reading the state register of the CPLD to determine an abnormal condition of the PSU or the VR power supply chips, and in response to the VR power supply chip being abnormal, analyzing a fault cause of the abnormal VR power supply chip according to the register state of the abnormal VR power supply chip;

in response to the CPLD without the abnormality recording function, reading the state register of the PSU and the VR power supply chips to determine the abnormal condition of the PSU or the VR power supply chips, and in response to the VR power supply chip being abnormal, analyzing the fault cause of the abnormal VR power supply chip according to the register state of the abnormal VR power supply chip.

In some embodiments, the analyzing the fault cause of the abnormal VR power supply chip according to the register state of the abnormal VR power supply chip includes:

in response to determining, based on the register state of the abnormal VR power supply chip, that the abnormal VR power supply chip has a phase fault, determining that a metal oxide semiconductor (MOS) tube of the abnormal VR power supply chip is damaged;

in response to determining, based on the register state of the abnormal VR power supply chip, that the abnormal VR power supply chip has an input undervoltage, checking whether a voltage of an upper level VR power supply chip of the abnormal VR power supply chip is normal, in response to the voltage of the upper level VR power supply chip being normal, determining that a fault exists in a link between the abnormal VR power supply chip and the upper level VR power supply chip;

in response to determining, based on the register state of the abnormal VR power supply chip, that the abnormal VR power supply chip has an over current protection (OCP), checking a next level circuit of the abnormal VR power supply chip;

in response to the next level circuit being a VR power supply chip, testing whether the next level VR power supply chip is accessible or whether a working state of thereof is abnormal, in response to the next level VR power supply chip being not accessible or having a phase fault, determining that the mainboard needs to be replaced;

in response to the next level circuit being a direct component that is not accessible, determining that the direct component needs to be replaced and recording a position or number of the direct component.

In some embodiments, a central processing unit (CPU) of the server is configured to start to work and boot a basic input output system (BIOS) after the power OK signal is sent by the CPLD; the BIOS is configured to perform a program self-test after being booted, and send a self-test signal after the program self-test is completed to complete the BIOS self-test stage;

a corresponding process of setting a fault monitoring policy for the BIOS self-test stage includes:

starting timing since the power OK signal is sent by the CPLD, and determining whether the self-test signal is sent by the BIOS when the timing time reaches a pre-set time T2; in response to the self-test signal being sent by the BIOS, determining that the program of the BIOS is completely trusted;

in response to no self-test signal being sent by the BIOS, determining that a problem exists in the program of the BIOS.

In some embodiments, the storage chip is configured to store a BIOS image file; the method for fault location in the boot process of the server further includes:

in response to determining that a problem exists in the program of the BIOS, determining whether power-on self-test (POST) code data of the BIOS is available;

in response to the POST code data being available, determining a fault cause of the program self-test of the BIOS according to the POST code data;

in response to the POST code data being not available, determining whether a power supply circuit related to the program self-test of the BIOS supplies power abnormally;

in response to determining that the power supply circuit related to the program self-test of the BIOS supplies power abnormally, performing fault cause analysis on the power supply abnormality of the power supply circuit;

in response to determining that the power supply circuit related to the program self-test of the BIOS supplies power normally, establishing a communication with the storage chip by controlling the channel switching device, and determining whether the BIOS image file in the storage chip is accessible;

in response to the BIOS image file being not accessible, determining that the BIOS image file is missing in the storage chip;

in response to the BIOS image file being accessible, performing data verification on the BIOS image file in the storage chip, and determining whether the verification is successful; in response to the verification being successful, performing a system reboot operation, and notifying a personnel to perform fault analysis when the boot fails after multiple reboots;

in response to the verification being unsuccessful, determining that the BIOS image file in the storage chip is damaged, and flashing the storage chip according to system backups of the BIOS image file and rebooting.

In some embodiments, the BIOS is further configured to: enter a running stage after the program self-test of the BIOS is completed; and send a boot complete signal after the running is completed to complete the BIOS running stage;

a corresponding process of setting a fault monitoring policy for the BIOS running stage includes:

starting timing since the self-test signal is sent by the BIOS, and determining whether the boot complete signal is sent by the BIOS when the timing time reaches a pre-set time T3; in response to the boot complete signal being sent by the BIOS, determining that the BIOS runs normally;

in response to no boot complete signal being sent by the BIOS, determining that the BIOS runs abnormally, and reading the POST fault code and/or BIOS fault register data corresponding to the BIOS, so as to perform fault location of the BIOS according to the POST fault code and/or the BIOS fault register data.

In some embodiments, the BIOS is further configured to guide, after the running of the BIOS being completed, the operating system (OS) to boot; the OS is configured to send, after ipmitool driver installed being loaded, a boot OK signal to complete the OS boot stage;

a corresponding process of setting a fault monitoring policy for the OS boot stage includes:

starting timing since the boot complete signal is sent by the BIOS, and determining whether the boot OK signal is sent by the OS when the timing time reaches a pre-set time T4;

in response to the boot OK signal being sent by the OS, determining that the OS boots successfully;

in response to no boot OK signal being sent by the OS, determining that the OS fails to boot.

In some embodiments, the server further includes an interface for modifying the pre-set time T4.

In some embodiments, the BIOS is further configured to guide the OS to boot after the running of the BIOS is completed;

a corresponding process of setting a fault monitoring policy for the OS boot stage includes:

monitoring a system log record transmitted via a system serial port after the OS boots, and determining whether an error information exists in the system log record within a pre-set monitoring time;

in response to no error information existing in the system log record, determining that the OS boots successfully;

in response to an error information existing in the system log record, determining that the OS fails to boot, and performing fault location based on the error information and historical system log records.

To solve the above technical problem, the present application further provides a system for fault location in a boot process of a server, including:

a pre-set module, configured to divide a whole boot process of the server into a plurality of stages in advance, and set a respective fault monitoring policy for each of the stages;

a monitoring module, configured to, when the boot process of the server proceeds to a target stage, monitor a current boot process of the server according to a fault monitoring policy corresponding to the target stage, and obtain a fault monitoring result corresponding to the target stage, wherein the target stage is any of the stages divided from the whole boot process of the server; and a location module, configured to perform, based on the obtained fault monitoring result, fault location of the server in response to a boot failure of the server.

To solve the above technical problem, the present application further provides an apparatus for fault location in a boot process of a server, including:

a memory for storing a computer program;

a processor for implementing the steps of the above method for fault location in the boot process of the server when executing the computer program.

BRIEF DESCRIPTION OF THE DRAWINGS

In order to more clearly illustrate the technical solutions of the embodiments of the present disclosure, the figures that are required to describe the embodiments or the related art will be briefly introduced below. Apparently, the figures that are described below illustrate merely some embodiments of the present disclosure, and those skilled in the art may obtain other figures according to these figures without paying creative work.

DETAILED DESCRIPTION OF THE EMBODIMENTS

The core of the present disclosure is to provide a method, system and apparatus for fault location in the boot process of a server, which performs fault monitoring on each stage of the boot process of a server, and is helpful to the fault location in the boot process of the server.

In order to make the objects, the technical solutions and the advantages of the embodiments of the present disclosure clearer, the technical solutions of the embodiments of the present disclosure will be clearly and completely described below with reference to the drawings of the embodiments of the present disclosure. Apparently, the described embodiments are merely a part of embodiments of the present disclosure, rather than all of the embodiments. All of the other embodiments obtained by those skilled in the art based on the embodiments of the present disclosure without paying creative work fall within the protection scope of the present disclosure.

Figure 1:
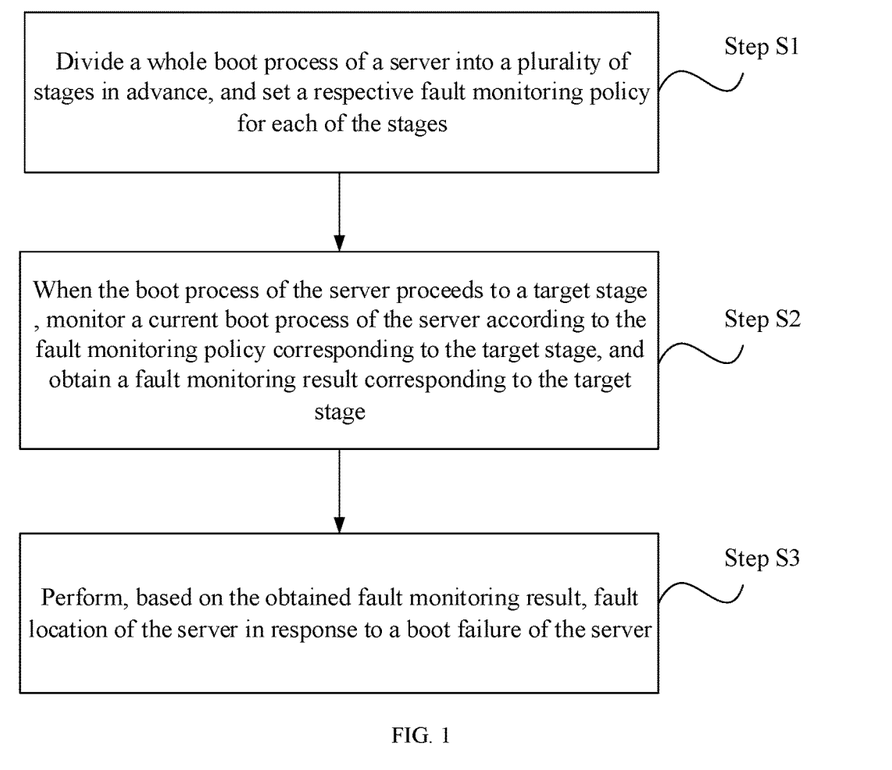
FIG. 1 is a flow chart of a method for fault location in a boot process of a server according to an embodiment of the present disclosure.

Referring to FIG. 1, FIG. 1 is a flow chart of a method for fault location in a boot process of a server according to an embodiment of the present disclosure.

The method for fault location in the boot process of the server includes steps described below.

At step S1, a whole boot process of a server is divided into a plurality of stages in advance, and a respective fault monitoring policy is set for each stage.

In particular, in the present disclosure, the whole boot process of the server is divided into a plurality of stages in advance, and a respective fault monitoring policy is set for each stage obtained from the division of the whole boot process of the server, so as to perform fault monitoring on the whole boot process of the server subsequently.

At step S2, when the boot process of the server proceeds to a target stage, the current boot process of the server is monitored according to the fault monitoring policy corresponding to the target stage, to obtain a fault monitoring result corresponding to the target stage.

It should be noted that the target stage of the present disclosure is any stage divided from the whole boot process of the server.

In particular, when the boot process of the server proceeds to a target stage, the present disclosure needs to monitor the current boot process of the server according to the fault monitoring policy corresponding to the target stage, and obtain a fault monitoring result corresponding to the target stage, so as to perform fault location of the server subsequently.

At step S3, in response to a boot failure of the server, fault location of the server is performed according to the obtained fault monitoring result.

In particular, in response to a boot failure of the server, the present disclosure performs the fault location of the server according to the obtained fault monitoring result in step S2, so as to determine a stage and a position where the fault occurs and a cause of the fault. Since the present disclosure performs fault monitoring on each stage in the boot process of the server, the fault location effect of the server is better.

According to the method for fault location in the boot process of the server provided by the present disclosure, the whole boot process of the server is divided into a plurality of stages in advance, and a respective fault monitoring policy is set for each stage; when the boot process of the server proceeds to a target stage, the current boot process of the server is monitored according to the fault monitoring policy corresponding to the target stage, to obtain a fault monitoring result corresponding to the target stage; and in response to boot failure of the server, fault location of the server is performed according to the obtained fault monitoring result. As can be seen, in the present disclosure, the fault monitoring is performed on each stage in the boot process of the server, which is beneficial to fault location in the boot process of the server.

Figure 2:
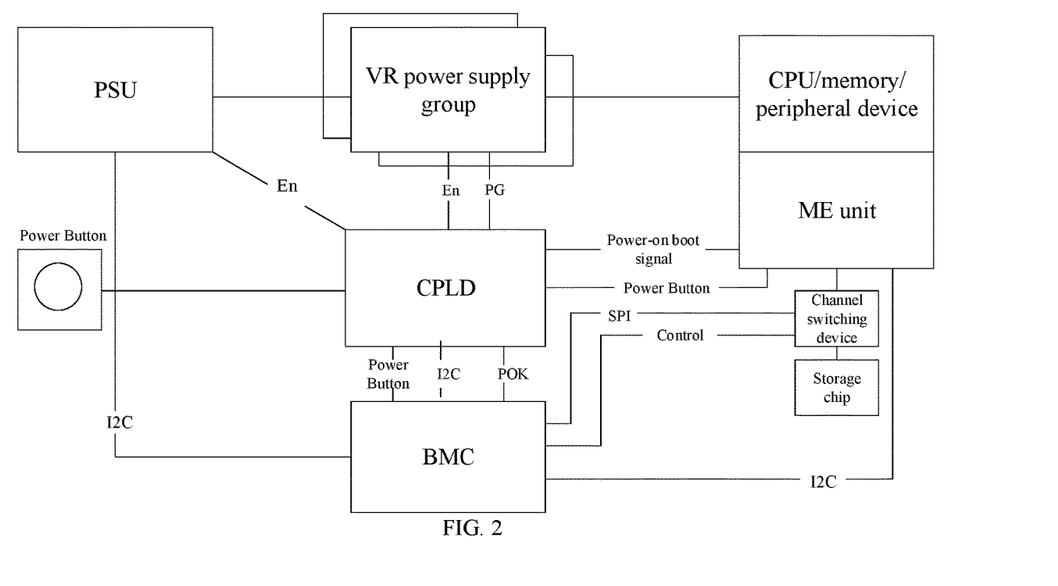
FIG. 2 is a schematic structural diagram illustrating a server according to an embodiment of the present disclosure.
Figure 3:
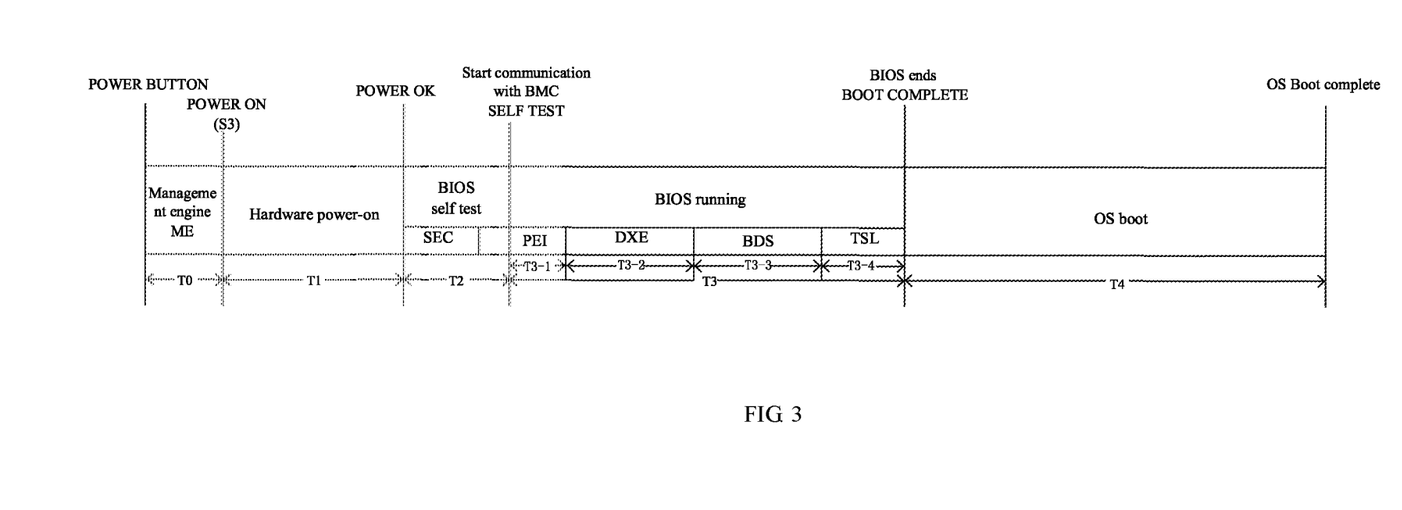
FIG. 3 is a diagram illustrating partition of a whole boot process of a server according to an embodiment of the present disclosure.

On the basis of the above-mentioned embodiments, referring to FIGS. 2 and 3, FIG. 2 is a schematic structural diagram illustrating a server according to an embodiment of the present disclosure; FIG. 3 is a diagram illustrating partition of a whole boot process of a server according to an embodiment of the present disclosure.

In some embodiments, the whole boot process of the server is divided into a plurality of stages by:

dividing the whole boot process of the server into a power-on mode entry stage, a hardware power-on stage, a basic input output system (BIOS) self-test stage, a BIOS running stage and an operating system (OS) boot stage.

In particular, the present disclosure may divide the whole boot process of the server into the power-on mode entry stage, the hardware power-on stage, the BIOS self-test stage, the BIOS running stage and the OS boot stage, or the present disclosure may also divide the whole boot process of the server according to other division forms, which is not particularly limited herein, and can be determined based on actual situations.

In some embodiments, the server includes a complex programmable logic device (CPLD) and a management engine (ME) unit. The CPLD is configured to receive a button signal of a power button and send the button signal to the ME unit via pass-through. The ME unit is configured to return a power-on boot signal to the CPLD after receiving the button signal to complete the power-on mode entry stage.

Accordingly, a process of setting a fault monitoring policy for the power-on mode entry stage includes:

starting timing in response to the CPLD receiving the button signal, and determining whether a power-on boot signal is sent by the ME unit when the timing time reaches a pre-set time T0;

determining that the ME unit run normally in response to the power-on boot signal being sent by the ME unit;

determining that the ME unit fails to run normally in response to no power-on boot signal being sent by the ME unit.

In particular, as for the power-on mode entry stage of the server, when a power button of the server is pressed or the server receives a remotely transmitted boot instruction, the signal level of the power button changes, and at this time, the button signal of the power button is sent to the CPLD of the server, and then sent to the ME unit of the server via pass-through. After receiving the button signal, the ME unit returns a power-on boot signal to the CPLD to complete the power-on mode entry stage, and then enters the hardware power-on stage.

Based on the above, since the ME unit will not send a power-on boot signal when it is abnormal, accordingly, the system may not enter a subsequent hardware power-on stage, and the system will not boot, thus the present disclosure starts timing when the button signal is received by the CPLD, and determines whether a power-on boot signal is sent by the ME unit when the timing time reaches a pre-set time T0 (for example 5s); if a power-on boot signal is sent by the ME unit within the specified time T0, it is determined that the running of the ME unit is normal; if the ME unit fails to send the power-on boot signal within the specified time T0, it is preliminarily determined that the running of the ME unit fails, and then the state of the ME unit is read again; if the ME unit cannot be connected or the state thereof is abnormal, it may be directly determined that the ME unit broke down, so as to make clear that the fault cause of system boot abnormality is due to ME unit breakdown, which is recorded in the log and reported to an operation and maintenance system.

In some embodiments, the server further includes a storage chip that is connected to the ME unit via a channel switching device and is used for storing the ME image file, and the method for fault location in the boot process of the server further includes:

in response to determining that the ME unit fails to run, determining whether a running state of the ME unit is available;

in response to the running state of the ME unit being available, determining that a running abnormity exists in the ME unit when the running state is abnormal;

in response to the running state of the ME unit being not available, determining whether a power supply voltage of the storage chip is normal;

in response to the power supply voltage being abnormal, determining that a peripheral circuit of the storage chip is abnormal;

in response to the power supply voltage being normal, determining that the peripheral circuit of the storage chip is normal, and establishing a communication with the storage chip by controlling the channel switching device, and determining whether the storage chip is accessible;

in response to the storage chip being not accessible, determining that the storage chip is abnormal;

in response to the storage chip being accessible, determining that the storage chip is normal, and determining whether the ME image file in the storage chip is available;

in response to the ME image file in the storage chip being not available, determining that the ME image file is missing in the storage chip;

in response to the ME image file in the storage chip being available, performing data verification on the ME image file in the storage chip, in response to a verification failure, determining that the ME image file in the storage chip is damaged, and flashing the storage chip according to system backups of the ME image file, and rebooting;

in response to determining that an abnormality still exists after rebooting, determining that the ME unit itself malfunctions.

Furthermore, the server in the present disclosure further includes a storage chip (such as a Flash chip), that is connected to the ME unit via a channel switching device (such as a switch); the channel switching device by default communicates the ME unit with the storage chip; and the ME image file is stored in the storage chip for the ME unit to read and run. That the ME unit fails to run may be caused by the abnormality of the storage chip, the abnormality of the peripheral circuit of the storage chip, the ME image file missing in the storage chip, damage of the ME image file in the storage chip, fault of the ME unit itself, etc. As a result, the ME unit fails to provide the power-on boot signal, thus the system cannot enter the power-on mode. Based on this, the causes why the ME unit fails to run are analyzed as follows. The running state of the ME unit is read first. If the running state of the ME unit is available, it indicates that the ME unit has no abnormality in communication with the outside, then the following cases may be excluded: the storage chip is abnormal; the peripheral circuit of the storage chip is abnormal; and the ME image file is missing in the storage chip. If the read running state of the ME unit is abnormal, then the ME unit has a running abnormality. If the running state of the ME unit is not available, there may be a case where the storage chip is abnormal, the peripheral circuit of the storage chip is abnormal, the ME image file is missing in the storage chip, the ME image file in the storage chip is damaged or the ME unit hangs up, and this is further analyzed as follows: 1) firstly, the power supply voltage of the storage chip is read, and it is determined whether the power supply voltage of the storage chip is normal, and if the power supply voltage is normal, it is determined that the peripheral circuit of the storage chip is normal; if the power supply voltage is abnormal, it is determined that the peripheral circuit of the storage chip is abnormal, the mainboard of the server is determined as faulty, an alarm is reported to request to replace the mainboard; 2) if the power supply voltage is normal, a communication with the storage chip is established by controlling the channel switching device, so as to access the storage chip; if the storage chip can be accessed normally, it is determined that the storage chip is normal; if the access cannot be accessed, it is determined that the storage chip is abnormal, and the mainboard is determined as faulty, an alarm is reported to request to replace the mainboard. 3) if the storage chip is normal, it is determined whether the ME image file may be read from the storage chip; if the ME image file in the storage chip cannot be read, the reason for this boot abnormality is recorded as missing of the ME image file in the storage chip, and it is determined whether there is the ME image file in the system database; if there is the ME image file in the database, the ME image file is wrote into the storage chip, and the system is rebooted after the ME image file is successfully wrote in to the storage chip; if there is no ME image file in the database, an alarm is reported to the operation and maintenance to request to refresh the storage chip. 4) if the ME image file in the storage chip is obtained, a data verification is performed on the ME image file to calculate a relevant verification value, and the calculated relevant verification value is compared with the verification value of the ME image file backed up by the system, and if the verification values are consistent with each other, then the comparison passes, that is, it is determined that the ME image file in the storage chip is not damaged; if the verification values are inconsistent, then the comparison fails, it is determined that the ME image file in the storage chip is damaged, relevant logs are recorded, and the storage chip is flashed according to the ME image file backed up by the system, and the system is rebooted to see whether it may be started normally; if it may be started normally, it can just verify that the reason of the last boot abnormality lies in that the ME image file in the storage chip is damaged. 5) if the system is still abnormal after reboot, it is determined that the ME unit itself fails, an alarm is reported to replace relevant components of the ME unit or replace the mainboard.

It should be noted that the order of the above operations may be performed independently or in a random order within the scope of the present disclosure.

In some embodiments, a power supply system of the server includes a power supply unit (PSU) and a plurality of voltage regulated (VR) power supply chips that are connected to the PSU and used for supplying power to each component of the server correspondingly.

The CPLD is further configured to: send a main power enable signal to the PSU after receiving the power-on boot signal; successively send a chip enable signal to the plurality of VR power supply chips after receiving a power good (PG) signal returned from the PSU; and send, after receiving the PG signals returned by all the VR power supply chips, a power OK signal to complete the hardware power-on stage; the CPLD, after being updated in version, is further configured to record an abnormal situation, where the PSU or any of the VR power supply chip fails to return the PG signal on time, to a state register of the CPLD correspondingly, and successively control the VR power supply chips and the PSU that are powered on to perform a power-off operation.

Accordingly, a process of setting a fault monitoring policy for the hardware power-on stage includes:

starting timing since the power-on boot signal is sent by the ME unit, and determining whether the power OK signal is sent by the CPLD when the timing time reaches a pre-set time T1;

in response to the power OK signal being sent, determining that a mainboard hardware of the server is powered on normally;

in response to no power OK signal being sent, determining that the mainboard hardware of the server is not powered on normally, and determining whether the CPLD has an abnormality recording function according to a version number of the CPLD;

in response to the CPLD having the abnormality recording function, reading the state register of the CPLD to determine an abnormal condition of the PSU or the VR power supply chips, and in response to the VR power supply chip being abnormal, analyzing a fault cause of the abnormal VR power supply chip according to the register state of the abnormal VR power supply chip;

in response to the CPLD without the abnormality recording function, reading the state register of the PSU and the VR power supply chips to determine the abnormal condition of the PSU or the VR power supply chips, and in response to the VR power supply chip being abnormal, analyzing the fault cause of the abnormal VR power supply chip according to the register state of the abnormal VR power supply chip.

In particular, in the hardware power-on stage of the server, in response to receiving the power-on boot signal sent by the ME unit, the CPLD first sends a main power enable (En) signal to the power supply unit (PSU), and then waits for a power good (PG) signal returned by the PSU. If the PSU is powered on normally, the PG signal is returned to the CPLD; if an abnormality occurs during the power-on of the PSU, no PG signal is returned to the CPLD. After the PSU is powered on normally, the CPLD starts the power-on action of the next path of power, that is, the CPLD successively sends a chip enable signal to a plurality of voltage regulated (VR) power supply chips, so that each VR power supply chip adjusts the output voltage of the PSU and provides power for a respective component of the system, such as a central processing unit (CPU), a memory and a hard disk, etc., and then waits for a power good (PG) signal returned by each VR power supply chip; if the VR power supply chip is powered on normally, the PG signal is returned to the CPLD; if an abnormality occurs during the power-on process of the VR power supply chip, no PG signal is returned to the CPLD. After receiving the PG signals returned by all VR power supply chips, the CPLD sends the power OK signal to complete the hardware power-on stage, and then the boot process enters the BIOS self-test stage.

It should be noted that the CPLD of the old version does not have an abnormality recording function, and the CPLD of the new version has the abnormality recording function: when the PSU or any VR power supply chip fails to return the PG signal on time, this abnormal situation is recorded into the PSU or VR power supply chips' own state register correspondingly, and at this time, the CPLD may successively control the powered-on VR power supply chip and PSU to perform power-off operation, as a result, the system cannot be powered on or booted.

Based on the above, the present disclosure starts timing since the power-on boot signal is sent by the ME unit, and determines whether a power OK signal is sent by the CPLD when the timing time reaches a pre-set time T1 (such as 10 s); if the power OK signal is sent, it is determined that the mainboard hardware of the server is powered on normally; if no power OK signal is sent, it is determined that the mainboard hardware of the server is not powered on normally.

In order to further locate an abnormal point, after determining that the mainboard hardware of the server is not powered on normally, the present disclosure also determines whether the CPLD has an abnormality recording function according to the version number of the CPLD; if the CPLD has the abnormality recording function, a state register of the CPLD is read so as to locate an abnormal situation of the PSU or the VR power supply chip, that is, determining whether the PSU has a power-on abnormality or which VR power supply chip has a power-on abnormality. When the VR power supply chip has an abnormal situation, the state register of the abnormal VR power supply chip is read via I2C (Inter-Integrated Circuit) so as to analyze the fault cause of the abnormal VR power supply chip according to the register state of the abnormal VR power supply chip. If the CPLD does not have an abnormality recording function, the state registers of the PSU and VR power supply chips are directly read so as to locate an abnormal situation of the PSU or the VR power supply chip, and when the VR power supply chip has an abnormal situation, the fault cause of the VR power supply chip is analyzed according to the register state of the abnormal VR power supply chip. In addition, in the present disclosure, if it is determined that the power-on of the PSU is abnormal, whether the system needs to replace the PSU may also be specified according to the register state of the PSU.

In some embodiments, a process of analyzing a fault cause of the abnormal VR power supply chip according to the register state of the abnormal VR power supply chip includes:
  in response to determining, based on the register state of the abnormal VR power supply chip, that the abnormal VR power supply chip has a phase fault, determining that a metal oxide semiconductor (MOS) tube of the abnormal VR power supply chip is damaged;
  in response to determining, based on the register state of the abnormal VR power supply chip, that the abnormal VR power supply chip has an input undervoltage, checking whether a voltage of an upper level VR power supply chip of the abnormal VR power supply chip is normal, in response to the voltage of the upper level VR power supply chip being normal, determining that a fault exists in a link between the abnormal VR power supply chip and the upper level VR power supply chip;
  in response to determining, based on the register state of the abnormal VR power supply chip, that the abnormal VR power supply chip has an over current protection (OCP), checking a next level circuit of the abnormal VR power supply chip;
  in response to the next level circuit being a VR power supply chip, testing whether the next level VR power supply chip is accessible or whether a working state of thereof is abnormal, in response to the next level VR power supply chip being not accessible or having a phase fault, determining that the mainboard needs to be replaced;
  in response to the next level circuit being a direct component that is not accessible, determining that the direct component needs to be replaced and recording a position or number of the direct component.

In particular, the present disclosure may obtain specific abnormal conditions of the chip according to the register state of the abnormal VR power supply chip, for example abnormal conditions such as OCP (over current protection), OVP (overvoltage protection), Phase Fault, input undervoltage. If the abnormal VR power supply chip has a phase fault, it is believed that the MOS tube of the abnormal VR power supply chip is damaged, and the mainboard needs to be replaced; at this time, relevant logs may be recorded and the fault point and fault cause may be reported, and it can determined that the mainboard has a fault. If the abnormal VR power supply chip has an input undervoltage, whether a voltage of an upper level VR power supply chip of the abnormal VR power supply chip is normal is checked, in response to determining that the voltage of the upper level VR power supply chip is normal, it is believed that a fault exists in the link between the abnormal VR power supply chip and the upper level VR power supply chip, and the mainboard needs to be replaced; at this time, relevant logs may be recorded and the fault point and fault cause may be reported, and it can determined that the mainboard has a fault. If the abnormal VR power supply chip has an over current protection (OCP), and the next level circuit of the abnormal VR power supply chip is a VR power supply chip, whether the next level VR power supply chip may be accessed normally or whether the working state thereof is abnormal is checked, in response to determining that the next level VR power supply chip cannot be accessed normally or has a phase fault, it is determined that the mainboard needs to be replaced, at this time, relevant logs may be recorded and the fault point and fault cause may be reported, and it can determined that the mainboard has a fault. If the abnormal VR power supply chip has an over current protection (OCP), and the next level circuit of the abnormal VR power supply chip is a direct component (such as a memory bank), and the direct component cannot be accessed, it is determined that the direct component needs to be replaced, at this time, relevant logs may be recorded and the fault point and fault cause may be reported, and the position or number of the replaced component may be determined. For the rest cases that cannot be directly determined, it is also feasible to record relevant logs and report the fault points and fault causes for reference by the operation and maintenance personnel.

It should be noted that the order of the above operations may be performed independently or in a random order within the scope of the present disclosure.

In some embodiments, after the power OK signal is sent by the CPLD, the CPU of the server starts to work, and boot a basic input output system (BIOS); the BIOS is configured to perform a program self-test after being booted, and send a self-test signal after the program self-test is completed to complete the BIOS self-test stage.

Accordingly, a process of setting a fault monitoring policy for the BIOS self-test stage includes:

starting timing since the power OK signal is sent by the CPLD, and determining whether the self-test signal is sent by the BIOS when the timing time reaches a pre-set time T2; in response to the self-test signal being sent by the BIOS, determining that the program of the BIOS is completely trusted;

in response to no self-test signal being sent by the BIOS, determining that a problem exists in the program of the BIOS.

In particular, as for the BIOS self-test stage of the server, in response to the power OK signal being sent by the CPLD, the CPU of the server releases the reset signal to start working, and the BIOS boots. The BIOS performs a program self-test after being booted, and sends a selftest signal after the program self-test is completed, so as to complete the BIOS self-test stage, and then the BIOS running stage is entered. It should be noted that when the BIOS program is missing or damaged, the BIOS program self-test will fail without issuing the self-test signal, and the system will not be started normally.

Based on the above, the present disclosure starts timing since the CPLD issues a power OK signal, and determines whether the BIOS issues a self-test signal when the timing time reaches a pre-set time T2 (such as 20 s); if the BIOS issues a self-test signal on time, it is determined that the program of the BIOS is completely trusted; if the BIOS fails to issue the self-test signal on time, it is determined that a problem exists in the program of the BIOS and the system cannot be started normally, at this time, it requires to flash the BIOS program, in other words, the mainboard needs to be replaced.

In some embodiments, the storage chip is further configured to store BIOS image file.

The method for fault location in the boot process of the server further includes:

in response to determining that a problem exists in the program of the BIOS, determining whether power-on self-test (POST) code data of the BIOS is available;

in response to the POST code data being available, determining a fault cause of the program self-test of the BIOS according to the POST code data;

in response to the POST code data being not available, determining whether a power supply circuit related to the program self-test of the BIOS supplies power abnormally;

in response to determining that the power supply circuit related to the program self-test of the BIOS supplies power abnormally, performing fault cause analysis on the power supply abnormality of the power supply circuit;

in response to determining that the power supply circuit related to the program self-test of the BIOS supplies power normally, establishing a communication with the storage chip by controlling the channel switching device, and determining whether the BIOS image file in the storage chip is accessible;

in response to the BIOS image file being not accessible, determining that the BIOS image file is missing in the storage chip;

in response to the BIOS image file being accessible, performing data verification on the BIOS image file in the storage chip, and determining whether the verification is successful;

in response to the verification being successful, performing a system reboot operation, and notifying a personnel to perform fault analysis when the boot fails after multiple reboots;

in response to the verification being unsuccessful, determining that the BIOS image file in the storage chip is damaged, and flashing the storage chip according to system backups of the BIOS image file and rebooting.

Further, the storage chip of the present disclosure also has a BIOS image file stored thereon. The reasons why a problem exists in the BIOS program may be that the BIOS image file is missing, the BIOS image file is damaged, the BIOS program hangs up abnormally, and it is generally necessary to flash the BIOS image file again, so as to quickly restore the system's running and reduce the waste of time and cost caused by replacing the mainboard by the customer. Based on this, the reason why a problem exists in the BIOS program is analyzed as follows: 1) firstly, the historical POST (self-test) code data of the BIOS is read; if the historical POST code data of the BIOS is available, the program self-test fault cause of the BIOS is determined according to the POST code data, such as CPU fault, memory fault, and relevant fault location and alarm reporting are executed. If the historical POST code data of the BIOS is not available, it indicates that an abnormality occurs at the start stage of the program and may be hardware related. 2) If the historical POST code data of the BIOS is not available, it is determined whether the power supply circuit related to the program self-test of the BIOS supplies power abnormally, for example whether the power supply state of components such as the CPU is abnormal; if the power supplying is abnormal, it is further determined whether the problem exists in the mainboard or the components, and the fault cause is reported. 3) If the power supplying is normal, a communication with the storage chip is established by controlling the channel switching device, and it is determined whether the BIOS image file in the storage chip is accessible; if no BIOS image file in the storage chip is accessible, it is determined that the BIOS image file is missing in the storage chip, and whether there is a BIOS image file backed up in the system database is determined; if there is a BIOS image file backed up in the system database, the BIOS image file is directly written into the storage chip, the log is recorded and refreshed, and the system is restarted; if the BIOS self-test stage succeeds after the system is restarted, it is verified that the fault cause is that the BIOS image file is missing in the storage chip, and relevant logs are recorded; if there is no BIOS image file backed up in the system database, an alarm is reported to the operation and maintenance system, so that the operation and maintenance personnel is arranged to flash the BIOS image file. 4) If the BIOS image file is accessible in the storage chip, a data verification is performed on the BIOS image file in the storage chip, a relevant verification value is calculated, and compared with a verification value of the BIOS image file backed up by the system, and if the verification values are consistent with each other, then the comparison succeeds, that is, it is determined that the BIOS image file in the storage chip is not damaged; if the verification values are inconsistent, then the comparison fails, that is, it is determined that the BIOS image file in the storage chip is damaged, relevant logs are recorded, and the image file is automatically restored by automatically flashing the backed-up BIOS image file into the storage chip, then the log is recorded and the system is restarted; if the BIOS self-test stage succeeds after the system is restarted, it is verified that the fault cause lies in that the BIOS image file in the storage chip is damaged. 5) If the BIOS self-test stage still fails after the system is restarted, the fault is reported to update the latest BIOS image file or replace the mainboard. 6) If the BIOS image file in the storage chip is not damaged, a mark is recorded to restart and retry operation; if the restart is normal, the recorded mark is cleared; if it fails to start after multiple restarting, a personnel is notified to perform fault analysis, for example, trying to replace a mainboard/a CPU/a memory of the system in turn for minimum range recovery, and relevant alarms are recorded and reported.

It should be noted that the order of the above operations may be performed independently or in a random order within the scope of the present disclosure.

In some embodiments, the BIOS is further configured to enter a running stage after the program self-test thereof is completed, and issue a boot complete signal after the BIOS is run to complete the BIOS running stage.

Accordingly, a process of setting a fault monitoring policy for the BIOS running stage includes:

starting timing since a self-test signal is sent by the BIOS, and determining whether a boot complete signal is sent by the BIOS when the timing time reaches a pre-set time T3;

in response to a boot complete signal being sent by the BIOS, determining that the BIOS runs normally;

otherwise, determining that the BIOS runs abnormally, and reading the POST fault code and/or BIOS fault register data corresponding to the BIOS to perform fault location of the BIOS according to the POST fault code and/or the BIOS fault register data.

In particular, as for the BIOS running stage of the server, the BIOS enters a running stage after the program self-test thereof is completed, and sends a boot complete signal after the BIOS is run to complete the BIOS running stage, and then an operating system (OS) boot stage is entered. It should be noted that the BIOS initializes the system during the running stage, and there are abnormalities and hangs for various reasons, resulting in the fault of boot, and at this time, the boot complete signal will not be issued. It should also be noted that the self-test signal sent by the BIOS is actually a first signal sent by the BIOS after completing the initialization of the direct communication link with the baseboard management controller (BMC) in the server, and represents that the BIOS and the BMC may directly communicate normally, and then taking this as the starting basis, various interactive signals and state notifications may be added later, for example, when the BIOS initializes a peripheral, under the condition that a peripheral abnormality causes a program abnormality, the BIOS may record relevant peripherals and state and send the same to the BMC, and the BMC saves the same to a reserved BIOS fault register; for example, in the TSL (Transient System Load) stage of the BIOS, if it is found that the system hard disk is missing, the OS boot block master boot record (MBR) is damaged or the master boot record (MBR) loading fails, the BIOS reports same to the BMC, and the BMC saves the same to the reserved BIOS fault register, so that the BIOS fault register data saved by the BMC may be used for more accurate fault location.

Based on this, the present disclosure starts timing since a self-test signal is sent by the BIOS, and determines whether a boot complete signal is sent by the BIOS when the timing time reaches a pre-set time T3 (such as 300 s); if the BIOS sends the boot complete signal on time, it is determined that the BIOS runs normally; if the BIOS fails to send a boot complete signal on time, it is determined that the BIOS runs abnormally, then a POST fault code and/or BIOS fault register data corresponding to the BIOS is read to locate fault stage and fault cause of the BIOS according to the POST fault code and/or BIOS fault register data, the fault stage and fault cause determined are reported via an alarm, so that the operating and maintaining replaces relevant components.

More particularly, the present disclosure may further divide the BIOS running stage into a SEC (Security verification) stage, a PEI (Pre-EFI Initialization) stage, a DXE (Driver Execution Environment) stage, a BDS (Boot Device Select) stage and a TSL (Transient System Load) stage, so as to make a separate judgement according to the situations of each stage of the BIOS running. A start signal is issued when the BIOS enters each stage, and a complete signal is issued when the stage is successfully executed, moreover, stage timings of T3-1, T3-2, T3-3 and T3-4 as shown in FIG. 3 are added; if a corresponding complete signal is received within the corresponding stage timing, it is determined that the stage runs normally; otherwise, the stage runs abnormally. In this way, the position of a fault is further determined more accurately, and the judgement of a fault is speeded up (without waiting for the timeout of T3, some devices may actually start for more than ten minutes). It should be noted that the above-mentioned stage timing time may be configured according to the actual configuration of the device.

In addition, with regard to an unknown or unclear fault, the present disclosure may record relevant marks and restart the device, and under the condition that the device restores to normal after restart or a particular reason is found, the marks are eliminated; under the condition that there is still an unknown or unclear fault after restarting for a plurality of times, an alarm is reported to the operation and maintenance system, and the operation and maintenance is notified to sequentially test and replace the components such as the CPU/a memory so as to minimize the fault location.

In some embodiments, the BIOS is further configured to: after the running thereof is completed, guide the operating system (OS) to boot. The OS is configured to send a boot ok signal after the loading of the ipmitool driver installed therein is completed so as to complete the OS boot stage.

Accordingly, a process of setting a fault monitoring policy for the OS boot stage includes:
  starting timing since a boot complete signal is sent by the BIOS, and determining whether a boot ok signal is sent by the OS when the timing time reaches a pre-set time T4;
  in response to a boot ok signal being sent by the OS, determining that the OS boots successfully;
  in response to no boot ok signal being sent by the OS, determining that the OS fails to boot.

In particular, as for the OS boot stage of the server, the BIOS guides the OS to boot after the running of the BIOS is completed, and an OS boot abnormality falls within the category of operating system; according to the principle of system security, the present disclosure cannot actively detect and track the state of the OS; therefore, the method used in the present disclosure is that the OS issues a boot OK signal after the loading of the ipmitool (a ipmi platform management tool in the form of command lines available on the linux system) driver installed therein is completed, so as to determine the completion of the OS boot according to the boot OK signal, and the whole boot process of the server ends.

Based on the above, a first fault monitoring policy of the OS boot stage is: the present disclosure starts timing since a boot complete signal is sent by the BIOS, and determines whether the OS sends a boot ok signal when the timing time reaches a pre-set time T4 (T4 is rationally set based on system function configuration); if the OS sends a boot OK signal on time, it is determined that the OS boots successfully; if the OS fails to send a boot OK signal on time, it is determined that the OS fails to boot, relevant logs are recorded and it is reported that the OS fails to boot, and it is requested to check an abnormity record of OS boot.

In some embodiments, the server further includes an interface for modifying the pre-set time T4.

In particular, considering that the boot time of the OS is highly correlated with the configuration of the system, resulting in a great difference in the boot time of the OS for different configured systems, the server of the present disclosure may be designed with an interface for modifying the pre-set time T4, so that the size of T4 may be defined according to the actual configuration of the system.

In some embodiments, the BIOS is further configured to guide the OS to boot after the running of the BIOS is completed.

Accordingly, a process of setting a fault monitoring policy for the OS boot stage includes:
  monitoring a system log record transmitted via a system serial port after the OS boots, and determining whether an error information exists in the system log record within a pre-set monitoring time;
  in response to no error information existing in the system log record, determining that the OS boots successfully;
  in response to an error information existing in the system log record, determining that the OS fails to boot, and performing fault location based on the error information and historical system log records.

In particular, a second fault monitoring policy for the OS boot stage is: monitoring a system log record transmitted via a system serial port after the OS boots, and determining whether an error information exists in the system log record within a pre-set monitoring time; in response to determining that no error information existing in the system log record, determining that the OS boots successfully; in response to determining that an error information existing in the system log record, determining that the OS fails to boot, and performing fault location based on the error information and historical system log records, and reporting an alarm of the abnormal situation of the OS, so that the operation and maintenance personnel may handle this.

In summary, the fault location method in the boot process of a server in the present disclosure may all be implemented by the baseboard management controller (BMC) of the server. As shown in FIG. 2, the BMC interacts with the PSU, the CPLD and the ME unit via an I2C bus; the BMC controls the channel switching device to switch channels through a control line of the channel switching device so that the BMC interacts with the storage chip through a SPI (Serial Peripheral Interface) bus.

Figure 4:
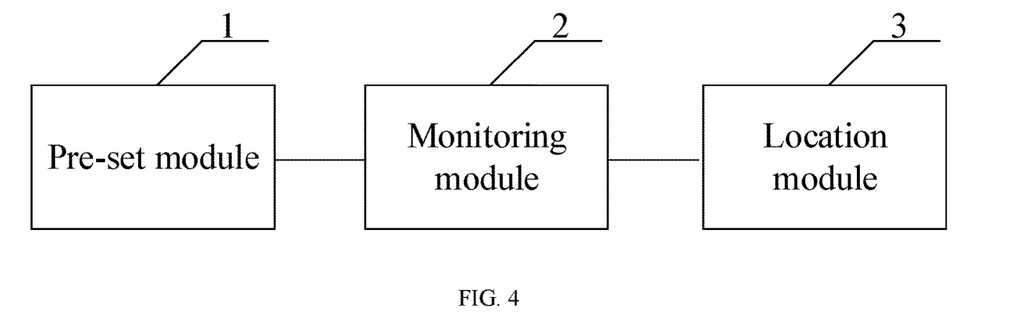
FIG. 4 is a schematic structural diagram illustrating a system for fault location in a boot process of a server according to an embodiment of the present disclosure.

Referring to FIG. 4, FIG. 4 is a schematic structural diagram illustrating a system for fault location in the boot process of a server according to an embodiment of the present disclosure.

The system for fault location in the boot process of a server includes:
  a pre-set module 1, configured to divide a whole boot process of a server into a plurality of stages in advance, and set a respective fault monitoring policy for each stage;
  a monitoring module 2, configured to, when the boot process of the server proceeds to a target stage, monitor a current boot process of the server according to the fault monitoring policy corresponding to the target stage, and obtain a fault monitoring result corresponding to the target stage, the target stage being any one of the stages; and
  a locating module 3, configured to perform, based on the obtained fault monitoring result, fault location of the server in response to a boot failure of the server.

Please refer to the above embodiments of the fault location method for the description of the system for fault location provided in the present disclosure, which will not be repeated herein.

The present disclosure also provides an apparatus for fault location in the boot process of a server, including:
  a memory for storing a computer program;
  a processor for implementing the steps of the fault location method in the boot process of a server described above when executing the computer program.

Please refer to the above embodiments of the fault location method for the description of the apparatus for fault location provided in the present disclosure, which will not be repeated herein.

It should be noted that, in the present specification, relationship terms such as first and second are only used to distinguish one entity or operation from another entity or operation, and do not necessarily require or imply any such actual relationship or sequence exists between these entities or operations. The terms "comprising", "including" or any other variation thereof are intended to encompass non-exclusive inclusion such that a process, method, article or device including a list of elements includes not only those elements, but also other not expressly listed elements, or also include elements inherent to such a process, method, article or apparatus. Without further limitation, an element qualified by the phrase "comprising a . . . " does not preclude the presence of additional identical elements in a process, method, article or apparatus that includes the element.

The above description of the disclosed embodiments is provided to enable those skilled in the art to make or use the present application. Various modifications to these embodiments will be readily apparent to those skilled in the art, and the general principles defined herein may be implemented in other embodiments without departing from the spirit or scope of the application. Therefore, the present application will not be limited to the embodiments illustrated herein, but comply with a widest scope consistent with the principles and novel features disclosed herein.

The invention claimed is:

1. A method for fault location in a boot process of a server, comprising:

dividing a whole boot process of the server into a plurality of stages in advance, and setting a respective fault monitoring policy for each of the stages;

when the boot process of the server proceeds to a target stage, monitoring current boot process of the server according to a fault monitoring policy corresponding to the target stage, and obtaining a fault monitoring result corresponding to the target stage, wherein the target stage is any of the stages divided from the whole boot process of the server;

performing, based on the obtained fault monitoring result, fault location of the server in response to a boot failure of the server;

wherein the dividing a whole boot process of the server into a plurality of stages comprises:

dividing the whole boot process of the server into a power-on mode entry stage, a hardware power-on stage, a basic input output system (BIOS) self-test stage, a BIOS running stage and an operating system (OS) boot stage;

wherein the server comprises a complex programmable logic device (CPLD) and a management engine (ME) unit, wherein the CPLD is configured to receive a button signal of a power button and transmit the button signal to the ME unit via pass-through, the ME unit is configured to return a power-on boot signal to the CPLD to complete the power-on mode entry stage in response to receiving the button signal;

wherein a corresponding process of setting a fault monitoring policy for the power-on mode entry stage comprises:

starting timing since the button signal is received by the CPLD, and determining whether the power-on boot signal is sent by the ME unit when the timing time reaches a pre-set time T0;

in response to the power-on boot signal being sent, determining that the ME unit runs normally;

in response to no power-on boot signal being sent, determining that the ME unit fails to run;

wherein the server further comprises a storage chip that is connected to the ME unit via a channel switching device and is used for storing a ME image file;

wherein the method for fault location in the boot process of the server further comprises:

in response to determining that the ME unit fails to run, determining whether a running state of the ME unit is available;

in response to the running state of the ME unit being available, determining that a running abnormity exists in the ME unit when the running state is abnormal;

in response to the running state of the ME unit being not available, determining whether a power supply voltage of the storage chip is normal;

in response to the power supply voltage being abnormal, determining that a peripheral circuit of the storage chip is abnormal;

in response to the power supply voltage being normal, determining that the peripheral circuit of the storage chip is normal, and establishing a communication with the storage chip by controlling the channel switching device, and determining whether the storage chip is accessible;

in response to the storage chip being not accessible, determining that the storage chip is abnormal;

in response to the storage chip being accessible, determining that the storage chip is normal, and determining whether the ME image file in the storage chip is available;

in response to the ME image file in the storage chip being not available, determining that the ME image file is missing in the storage chip;

in response to the ME image file in the storage chip being available, performing data verification on the ME image file in the storage chip, in response to a verification failure, determining that the ME image file in the storage chip is damaged, and flashing the storage chip according to system backups of the ME image file, and rebooting;

in response to determining that an abnormality still exists after rebooting, determining that the ME unit itself malfunctions.

2. The method for fault location in the boot process of the server according to claim 1, wherein a power supply system of the server comprises a power supply unit (PSU) and a plurality of voltage regulated (VR) power supply chips connected to the PSU, wherein each of the VR power supply chips configured to supply power to a respective component of the server;

and the CPLD is further configured to: send a main power enable signal to the PSU after receiving the power-on boot signal; successively send a chip enable signal to the plurality of VR power supply chips after receiving a power good (PG) signal returned from the PSU; and send, after receiving the PG signals returned by all the VR power supply chips, a power OK signal to complete the hardware power-on stage; the CPLD, after being updated in version, is further configured to record an abnormal situation, where the PSU or any of the VR power supply chip fails to return the PG signal on time, to a state register of the CPLD correspondingly, and successively control the VR power supply chips and the PSU that are powered on to perform a power-off operation;

a corresponding process of setting a fault monitoring policy for the hardware power-on stage comprises:

starting timing since the power-on boot signal is sent by the ME unit, and determining whether the power OK signal is sent by the CPLD when the timing time reaches a pre-set time T1;

in response to the power OK signal being sent, determining that a mainboard hardware of the server is powered on normally;

in response to no power OK signal being sent, determining that the mainboard hardware of the server is not powered on normally, and determining whether the CPLD has an abnormality recording function according to a version number of the CPLD;

in response to the CPLD having the abnormality recording function, reading the state register of the CPLD to determine an abnormal condition of the PSU or the VR power supply chips, and in response to the VR power supply chip being abnormal, analyzing a fault cause of the abnormal VR power supply chip according to the register state of the abnormal VR power supply chip;

in response to the CPLD without the abnormality recording function, reading the state register of the PSU and the VR power supply chips to determine the abnormal condition of the PSU or the VR power supply chips, and in response to the VR power supply chip being abnormal, analyzing the fault cause of the abnormal VR power supply chip according to the register state of the abnormal VR power supply chip.

3. The method for fault location in the boot process of the server according to claim 1, wherein the analyzing the fault cause of the abnormal VR power supply chip according to the register state of the abnormal VR power supply chip comprises:
  in response to determining, based on the register state of the abnormal VR power supply chip, that the abnormal VR power supply chip has a phase fault, determining that a metal oxide semiconductor (MOS) tube of the abnormal VR power supply chip is damaged;
  in response to determining, based on the register state of the abnormal VR power supply chip, that the abnormal VR power supply chip has an input undervoltage, checking whether a voltage of an upper level VR power supply chip of the abnormal VR power supply chip is normal, in response to the voltage of the upper level VR power supply chip being normal, determining that a fault exists in a link between the abnormal VR power supply chip and the upper level VR power supply chip;
  in response to determining, based on the register state of the abnormal VR power supply chip, that the abnormal VR power supply chip has an over current protection (OCP), checking a next level circuit of the abnormal VR power supply chip;
  in response to the next level circuit being a VR power supply chip, testing whether the next level VR power supply chip is accessible or whether a working state of thereof is abnormal, in response to the next level VR power supply chip being not accessible or having a phase fault, determining that the mainboard needs to be replaced;
  in response to the next level circuit being a direct component that is not accessible, determining that the direct component needs to be replaced and recording a position or number of the direct component.

4. The method for fault location in the boot process of the server according to claim 1, wherein a central processing unit (CPU) of the server is configured to start to work and boot a basic input output system (BIOS) after the power OK signal is sent by the CPLD; the BIOS is configured to perform a program self-test after being booted, and send a self-test signal after the program self-test is completed to complete the BIOS self-test stage;
  a corresponding process of setting a fault monitoring policy for the BIOS self-test stage comprises:
  starting timing since the power OK signal is sent by the CPLD, and determining whether the self-test signal is sent by the BIOS when the timing time reaches a pre-set time T2;
  in response to the self-test signal being sent by the BIOS, determining that the program of the BIOS is completely trusted;
  in response to no self-test signal being sent by the BIOS, determining that a problem exists in the program of the BIOS.

5. The method for fault location in the boot process of the server according to claim 4, wherein the storage chip is configured to store a BIOS image file;
  wherein the method for fault location in the boot process of the server further comprises:
  in response to determining that a problem exists in the program of the BIOS, determining whether power-on self-test (POST) code data of the BIOS is available;
  in response to the POST code data being available, determining a fault cause of the program self-test of the BIOS according to the POST code data;
  in response to the POST code data being not available, determining whether a power supply circuit related to the program self-test of the BIOS supplies power abnormally;
  in response to determining that the power supply circuit related to the program self-test of the BIOS supplies power abnormally, performing fault cause analysis on the power supply abnormality of the power supply circuit;
  in response to determining that the power supply circuit related to the program self-test of the BIOS supplies power normally, establishing a communication with the storage chip by controlling the channel switching device, and determining whether the BIOS image file in the storage chip is accessible;
  in response to the BIOS image file being not accessible, determining that the BIOS image file is missing in the storage chip;
  in response to the BIOS image file being accessible, performing data verification on the BIOS image file in the storage chip, and determining whether the verification is successful;
  in response to the verification being successful, performing a system reboot operation, and notifying a personnel to perform fault analysis when the boot fails after multiple reboots;
  in response to the verification being unsuccessful, determining that the BIOS image file in the storage chip is damaged, and flashing the storage chip according to system backups of the BIOS image file and rebooting.

6. The method for fault location in the boot process of the server according to claim 4, wherein the BIOS is further configured to: enter a running stage after the program self-test of the BIOS is completed; and send a boot complete signal after the running is completed to complete the BIOS running stage;
  a corresponding process of setting a fault monitoring policy for the BIOS running stage comprises:
  starting timing since the self-test signal is sent by the BIOS, and determining whether the boot complete signal is sent by the BIOS when the timing time reaches a pre-set time T3;
  in response to the boot complete signal being sent by the BIOS, determining that the BIOS runs normally;
  in response to no boot complete signal being sent by the BIOS, determining that the BIOS runs abnormally, and reading the POST fault code and/or BIOS fault register data corresponding to the BIOS, so as to perform fault location of the BIOS according to the POST fault code and/or the BIOS fault register data.

7. The method for fault location in the boot process of the server according to claim 6, wherein the BIOS is further configured to guide, after the running of the BIOS being completed, the operating system (OS) to boot; the OS is configured to send, after ipmitool driver installed being loaded, a boot OK signal to complete the OS boot stage;
  a corresponding process of setting a fault monitoring policy for the OS boot stage comprises:

starting timing since the boot complete signal is sent by the BIOS, and determining whether the boot OK signal is sent by the OS when the timing time reaches a pre-set time T4;

in response to the boot OK signal being sent by the OS, determining that the OS boots successfully;

in response to no boot OK signal being sent by the OS, determining that the OS fails to boot.

8. The method for fault location in the boot process of the server according to claim 7, wherein the server further comprises an interface for modifying the pre-set time T4.

9. The method for fault location in the boot process of the server according to claim 6, wherein the BIOS is further configured to guide the OS to boot after the running of the BIOS is completed;

a corresponding process of setting a fault monitoring policy for the OS boot stage comprises:

monitoring a system log record transmitted via a system serial port after the OS boots, and determining whether an error information exists in the system log record within a pre-set monitoring time;

in response to no error information existing in the system log record, determining that the OS boots successfully;

in response to an error information existing in the system log record, determining that the OS fails to boot, and performing fault location based on the error information and historical system log records.

10. An apparatus for fault location in a boot process of a server, comprising:

a memory for storing a computer program; and a processor, wherein the computer program, when executed by the processor, causes the processor to perform operations of:

dividing a whole boot process of the server into a plurality of stages in advance, and setting a respective fault monitoring policy for each of the stages;

when the boot process of the server proceeds to a target stage, monitoring current boot process of the server according to a fault monitoring policy corresponding to the target stage, and obtaining a fault monitoring result corresponding to the target stage, wherein the target stage is any of the stages divided from the whole boot process of the server;

performing, based on the obtained fault monitoring result, fault location of the server in response to a boot failure of the server;

wherein the processor is further configured to perform operations of:

dividing the whole boot process of the server into a power-on mode entry stage, a hardware power-on stage, a basic input output system (BIOS) self-test stage, a BIOS running stage and an operating system (OS) boot stage;

wherein the server comprises a complex programmable logic device (CPLD) and a management engine (ME) unit, wherein the CPLD is configured to receive a button signal of a power button and transmit the button signal to the ME unit via pass-through, the ME unit is configured to return a power-on boot signal to the CPLD to complete the power-on mode entry stage in response to receiving the button signal;

wherein the processor is further configured to perform operations of:

starting timing since the button signal is received by the CPLD, and determining whether the power-on boot signal is sent by the ME unit when the timing time reaches a pre-set time T0;

in response to the power-on boot signal being sent, determining that the ME unit runs normally;

in response to no power-on boot signal being sent, determining that the ME unit fails to run;

wherein the server further comprises a storage chip that is connected to the ME unit via a channel switching device and is used for storing a ME image file;

wherein the processor is further configured to perform operations of:

in response to determining that the ME unit fails to run, determining whether a running state of the ME unit is available;

in response to the running state of the ME unit being available, determining that a running abnormality exists in the ME unit when the running state is abnormal;

in response to the running state of the ME unit being not available, determining whether a power supply voltage of the storage chip is normal;

in response to the power supply voltage being abnormal, determining that a peripheral circuit of the storage chip is abnormal;

in response to the power supply voltage being normal, determining that the peripheral circuit of the storage chip is normal, and establishing a communication with the storage chip by controlling the channel switching device, and determining whether the storage chip is accessible;

in response to the storage chip being not accessible, determining that the storage chip is abnormal;

in response to the storage chip being accessible, determining that the storage chip is normal, and determining whether the ME image file in the storage chip is available;

in response to the ME image file in the storage chip being not available, determining that the ME image file is missing in the storage chip;

in response to the ME image file in the storage chip being available, performing data verification on the ME image file in the storage chip, in response to a verification failure, determining that the ME image file in the storage chip is damaged, and flashing the storage chip according to system backups of the ME image file, and rebooting;

in response to determining that an abnormality still exists after rebooting, determining that the ME unit itself malfunctions.

11. The method for fault location in the boot process of the server according to claim 4, wherein the self-test signal is sent by the BIOS after initialization of a direct communication link with a baseboard management controller (BMC) in the server, and represents that the BIOS and the BMC are allowed to directly communicate.

12. The method for fault location in the boot process of the server according to claim 6, wherein the BIOS running stage is further divided into a SEC (Security verification) stage, a PEI (Pre-EFI Initialization) stage, a DXE (Driver Execution Environment) stage, a BDS (Boot Device Select) stage and a TSL (Transient System Load) stage.

13. A non-transient computer-readable storage medium, wherein the computer-readable storage medium is stored with a computer program that, when executed by a processor, causes the processor to perform operations of:

dividing a whole boot process of the server into a plurality of stages in advance, and setting a respective fault monitoring policy for each of the stages;

when the boot process of the server proceeds to a target stage, monitoring current boot process of the server according to a fault monitoring policy corresponding to the target stage, and obtaining a fault monitoring result corresponding to the target stage, wherein the target stage is any of the stages divided from the whole boot process of the server;

performing, based on the obtained fault monitoring result, fault location of the server in response to a boot failure of the server;

wherein the processor is further configured to perform operations of:

dividing the whole boot process of the server into a power-on mode entry stage, a hardware power-on stage, a basic input output system (BIOS) self-test stage, a BIOS running stage and an operating system (OS) boot stage;

wherein the server comprises a complex programmable logic device (CPLD) and a management engine (ME) unit, wherein the CPLD is configured to receive a button signal of a power button and transmit the button signal to the ME unit via pass-through, the ME unit is configured to return a power-on boot signal to the CPLD to complete the power-on mode entry stage in response to receiving the button signal;

wherein the processor is further configured to perform operations of:

starting timing since the button signal is received by the CPLD, and determining whether the power-on boot signal is sent by the ME unit when the timing time reaches a pre-set time T0;

in response to the power-on boot signal being sent, determining that the ME unit runs normally;

in response to no power-on boot signal being sent, determining that the ME unit fails to run;

wherein the server further comprises a storage chip that is connected to the ME unit via a channel switching device and is used for storing a ME image file;

wherein the processor is further configured to perform operations of:

in response to determining that the ME unit fails to run, determining whether a running state of the ME unit is available;

in response to the running state of the ME unit being available, determining that a running abnormity exists in the ME unit when the running state is abnormal;

in response to the running state of the ME unit being not available, determining whether a power supply voltage of the storage chip is normal;

in response to the power supply voltage being abnormal, determining that a peripheral circuit of the storage chip is abnormal;

in response to the power supply voltage being normal, determining that the peripheral circuit of the storage chip is normal, and establishing a communication with the storage chip by controlling the channel switching device, and determining whether the storage chip is accessible;

in response to the storage chip being not accessible, determining that the storage chip is abnormal;

in response to the storage chip being accessible, determining that the storage chip is normal, and determining whether the ME image file in the storage chip is available;

in response to the ME image file in the storage chip being not available, determining that the ME image file is missing in the storage chip;

in response to the ME image file in the storage chip being available, performing data verification on the ME image file in the storage chip, in response to a verification failure, determining that the ME image file in the storage chip is damaged, and flashing the storage chip according to system backups of the ME image file, and rebooting;

in response to determining that an abnormality still exists after rebooting, determining that the ME unit itself malfunctions.

14. The apparatus for fault location in the boot process of the server according to claim 10, wherein a power supply system of the server comprises a power supply unit (PSU) and a plurality of voltage regulated (VR) power supply chips connected to the PSU, wherein each of the VR power supply chips configured to supply power to a respective component of the server;

and the CPLD is further configured to: send a main power enable signal to the PSU after receiving the power-on boot signal; successively send a chip enable signal to the plurality of VR power supply chips after receiving a power good (PG) signal returned from the PSU; and send, after receiving the PG signals returned by all the VR power supply chips, a power OK signal to complete the hardware power-on stage; the CPLD, after being updated in version, is further configured to record an abnormal situation, where the PSU or any of the VR power supply chip fails to return the PG signal on time, to a state register of the CPLD correspondingly, and successively control the VR power supply chips and the PSU that are powered on to perform a power-off operation;

wherein the processor is further configured to perform operations of:

starting timing since the power-on boot signal is sent by the ME unit, and determining whether the power OK signal is sent by the CPLD when the timing time reaches a pre-set time T1;

in response to the power OK signal being sent, determining that a mainboard hardware of the server is powered on normally;

in response to no power OK signal being sent, determining that the mainboard hardware of the server is not powered on normally, and determining whether the CPLD has an abnormality recording function according to a version number of the CPLD;

in response to the CPLD having the abnormality recording function, reading the state register of the CPLD to determine an abnormal condition of the PSU or the VR power supply chips, and in response to the VR power supply chip being abnormal, analyzing a fault cause of the abnormal VR power supply chip according to the register state of the abnormal VR power supply chip;

in response to the CPLD without the abnormality recording function, reading the state register of the PSU and the VR power supply chips to determine the abnormal condition of the PSU or the VR power supply chips, and in response to the VR power supply chip being abnormal, analyzing the fault cause of the abnormal VR power supply chip according to the register state of the abnormal VR power supply chip.

* * * * *